US012155240B2

(12) United States Patent
Brocklesby et al.

(10) Patent No.: US 12,155,240 B2
(45) Date of Patent: Nov. 26, 2024

(54) REDUCED CAMERA SIZE WITH MAGNET ATTACHMENT AND WIRELESS CHARGING

(71) Applicant: DELL PRODUCTS L.P., Round Rock, TX (US)

(72) Inventors: Brandon Brocklesby, Pflugerville, TX (US); Jason S. Morrison, Chadron, NE (US)

(73) Assignee: Dell Products L.P., Round Rock, TX (US)

(*) Notice: Subject to any disclaimer, the term of this patent is extended or adjusted under 35 U.S.C. 154(b) by 132 days.

(21) Appl. No.: 17/971,296

(22) Filed: Oct. 21, 2022

(65) Prior Publication Data

US 2024/0136866 A1 Apr. 25, 2024
US 2024/0235282 A9 Jul. 11, 2024

(51) Int. Cl.
*H02J 50/90* (2016.01)
*G03B 17/02* (2021.01)
*H02J 7/00* (2006.01)
*H02J 50/10* (2016.01)

(52) U.S. Cl.
CPC ............ *H02J 50/90* (2016.02); *H02J 7/0042* (2013.01); *H02J 50/10* (2016.02)

(58) Field of Classification Search
CPC ........... H02J 50/10; H02J 50/90; H04N 23/50
See application file for complete search history.

(56) References Cited

U.S. PATENT DOCUMENTS

| | | | |
|---|---|---|---|
| 2015/0280483 A1* | 10/2015 | Golko | H02J 50/90 320/108 |
| 2015/0345699 A1* | 12/2015 | Manniche | F16C 11/0623 73/866.5 |
| 2019/0006873 A1 | 1/2019 | Aurongzeb et al. | |
| 2022/0239124 A1 | 7/2022 | Aurongzeb et al. | |

FOREIGN PATENT DOCUMENTS

WO  WO-2020016146 A1 * 1/2020  .............. B01L 1/025

* cited by examiner

*Primary Examiner* — Minh Q Phan
(74) *Attorney, Agent, or Firm* — Larson Newman, LLP

(57) ABSTRACT

A camera module includes a camera, a charging coil, and a magnetic assembly. The charging coil is located in a bottom portion of the camera module. The charging coil provides wireless charging of the camera. The magnetic assembly is located in a rear portion of the camera module. The magnetic polarities of the magnetic assembly produce a large magnetic flux outside the camera module and a low magnetic flux within the camera module.

20 Claims, 5 Drawing Sheets

REDUCED CAMERA SIZE WITH MAGNET ATTACHMENT AND WIRELESS CHARGING

CROSS REFERENCE TO RELATED APPLICATION

Related subject matter is contained in co-pending U.S. patent application Ser. No. 17/577,968 entitled "Reversible Chargeable Camera and Dock with Rear Wall Privacy," and filed Jan. 18, 2022, the disclosure of which is hereby incorporated by reference.

FIELD OF THE DISCLOSURE

This disclosure generally relates to information handling systems, and more particularly relates to a reduced camera size with magnet attachment and wireless charging.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A camera module includes a camera, a charging coil, and a magnetic assembly. The charging coil is located in a bottom portion of the camera module. The charging coil may provide wireless charging of the camera. The magnetic assembly is located in a rear portion of the camera module. The magnetic polarities of the magnetic assembly may produce a large magnetic flux outside the camera module and a low magnetic flux within the camera module.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
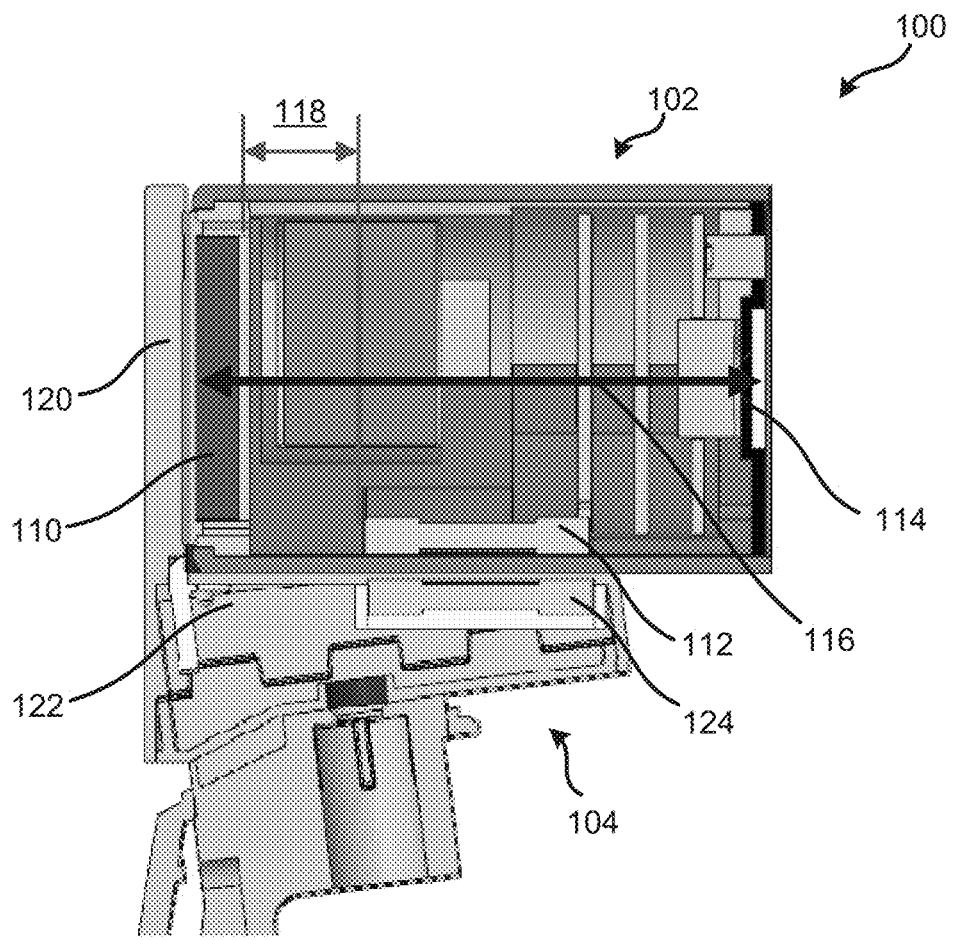
FIG. 1 is a cross-sectional view of a portion of a camera system according to an embodiment of the present disclosure.

FIG. 1 shows a camera system 100 for an information handling system, such as a personal laptop or a desktop monitor, according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Camera system 100 includes a camera module 102 and a charging stand 104. Camera module 102 includes a magnetic assembly 110, a charging coil 112, and a lens 114. In an example, camera module 102 may have a width 116 from an outer edge of magnetic assembly 110 to an outer edge of lens 114. Camera module 102 may include a particular separation distance 118 between magnetic assembly 110 and charging coil 112. In an example, magnetic assembly 110 may be any suitable shape, such that the magnetic assembly is the same shape as the camera. Charging stand 104 includes a back support 120 and a base 122, which in turn includes a charging coil 124.

In certain examples, camera module 102 may be placed on a display with internal metal supports. Based on camera module 102 being placed anywhere on the display, the position can be optimized so "eye to eye" contact is made during video conferencing meetings. Camera module 102 may be held to the display by magnetic assembly 110. In this example, a size of camera module 102 may be important to minimize and amount of the display occupied by the camera module. During operation, the camera within camera module 102 may be paired with an information handling system, such as a personal laptop or desktop computer, to provide video for a video conference or the like.

In an example, when camera module 102 is placed on charging stand 104, the camera module may be held in place by charging coils 112 and 124, and small magnets in the base (not shown) for alignment. In certain examples, charging coil 112 may be located within camera module 102 so that charging coil 112 may be properly aligned with charging coil 124 of charging stand 104 when magnetic assembly 110 is in physical communication with back support 120. The proper alignment of charging coils 112 and 124 enables wireless charging of the camera within camera module 102.

In an example, magnetic assembly 110 may include different sections, and each section may include north and south poles as will be described below with respect to FIG. 3. In certain examples, the polarization of each section in magnetic assembly 110 may be configured or oriented such that a magnetic flux of the magnetic assembly may be as small as possible in the direction of charging coil 112. As the magnetic flux of magnetic assembly 110 decreases in the direction of charging coil 112, separation distance 118 may also decrease. In an example, the size of camera module 102 may be directly related to separate width 118. For example, the smaller separation width 118 between magnetic assembly 110 and charging coil 112, the smaller size of camera module 102 may be possible. In certain examples, separation width 118 may be the width or distance needed between magnetic assembly 110 and charging coil 112 to prevent the magnetic flux from the magnetic assembly from interfering with the wireless charging received by charging coil 112.

Figure 2:
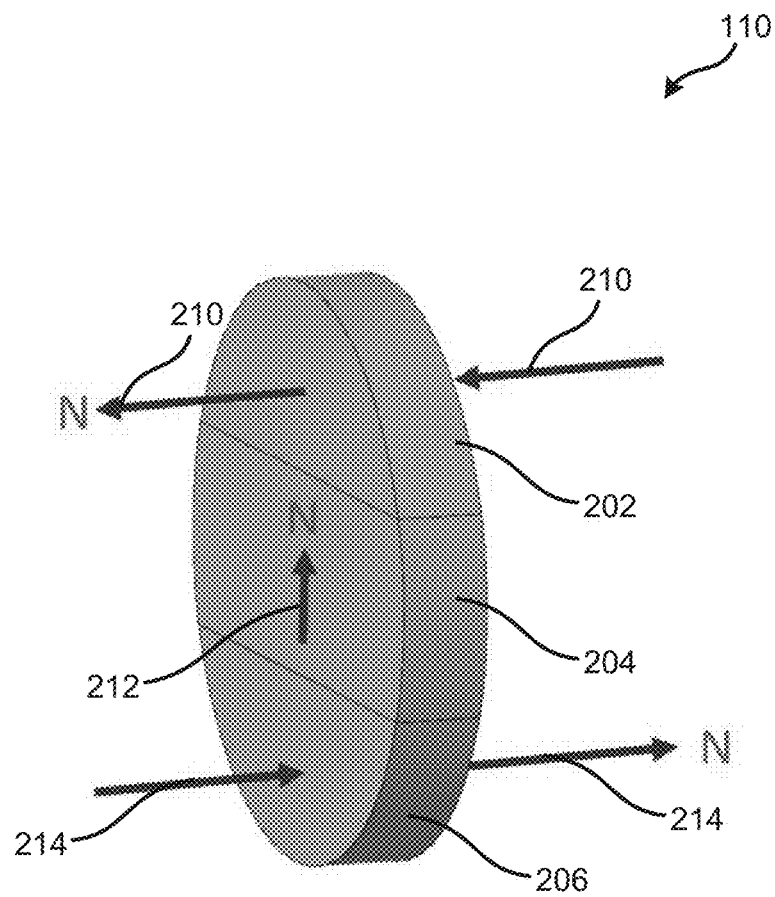
FIG. 2 is a perspective view of a magnetic assembly of a camera module according to an embodiment of the present disclosure.

FIG. 2 illustrates magnetic assembly 110 according to an embodiment of the present disclosure. Magnetic assembly 110 includes sections 202, 204, and 206. In an example, each section 202, 204, and 206 may be a separate magnet with a respective polarization. For example, the polarization of section 202 may change from a south pole to a north pole in the direction of arrow 210. Similarly, the polarization of section 204 may change from a south pole to a north pole in the direction of arrow 212. The polarization of section 206 may change from a south pole to a north pole in the direction of arrow 214. In an example, section 202, 204, and 206 may be securely mounted or otherwise connected to one another, such that the polarities of the sections to not force one or more of the sections to change orientations.

Figure 3:
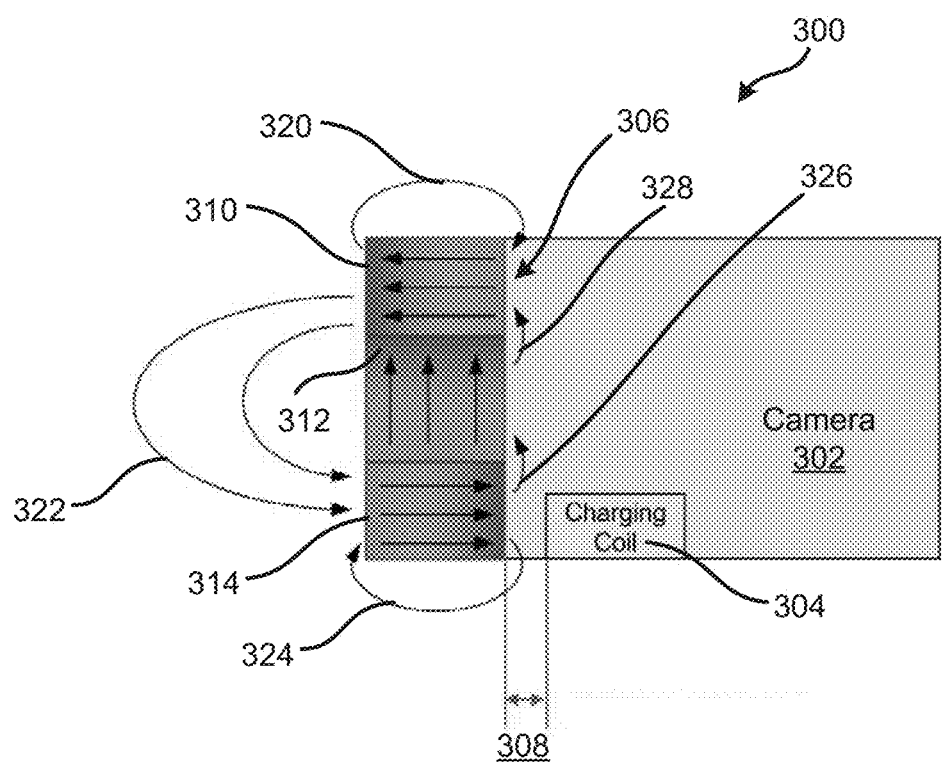
FIG. 3 is a block diagram of a camera module according to an embodiment of the present disclosure.

FIG. 3 illustrates a camera module 300 according to an embodiment of the present disclosure. In an example, camera module 300 may be substantially similar to camera module 102 of FIG. 1. Camera module 300 includes a camera 302, a charging coil 304, and a magnetic assembly 306. Camera 302 may capture different images. In an example, a separation distance 308 is a distance from an inner edge of magnetic assembly 306 to charging coil 304. Magnetic assembly 306 is created from multiple individual magnets or sections 310, 312, and 314.

In an example, the different polarities of magnets 310, 312, and 314 are represented by the arrows in each magnet or section of magnetic assembly 306. For example, an inner face of magnet 310 may be a south polarity and the outer face may be a north polarity. A bottom edge of magnet 312, such as an edge in physical communication with magnet 314, may be a south polarity and a north polarity at the top edge of the magnet, such as the edge in physical communication with magnet 310. In an example, an inner face of magnet 314 may be a north polarity and the outer face may be a south polarity. In certain examples, each of the polarities of magnets 310, 312, and 314 may be reversed without varying from the scope of this disclosure.

In certain examples, different magnetic fluxes 320, 322, 324, 326, and 328 may be generated by the different sections of magnetic assembly 306, such magnets 310, 312, and 314. In an example, the polarities in magnets 310, 312, and 314 may be in a hallbach design. Based on the hallbach design of magnets 310, 312, and 314 of magnetic assembly 306, magnetic flux 322 may be higher than normal, magnetic fluxes 320 and 324 may be a typical amount, and magnetic fluxes 326 and 328 may be lower than normal. In this example, the low amount of magnetic fluxes 326 and 328 may enable the separation distance 308 between magnetic assembly 306 and charging coil 304 to be smaller as compared to previous camera modules. In certain examples, separation distance 308 may be the distance charging coil 304 may be from attachment 306.

Separation distance 308 distance needed between magnetic assembly 306 and charging coil 304 to prevent the magnetic fluxes 326 and 328 from interfering with the wireless charging received by charging coil 304. In an example, the higher amount of magnetic flux 322 may enable camera module 300 to be securely attached to a metallic surface for the camera module to be mounted. In certain examples, the higher amount of magnetic flux 322 may enable camera module 300 to be securely attached to a display device of an information handling system, such as video display 534 of information handling system 500 in FIG. 5. In different examples, the ratio among magnets 310, 312, and 314 may vary from embodiment to embodiment. Based on the different ratios, the magnetic fluxes 320, 322, 324, 326, and 328 may also vary.

Figure 4:
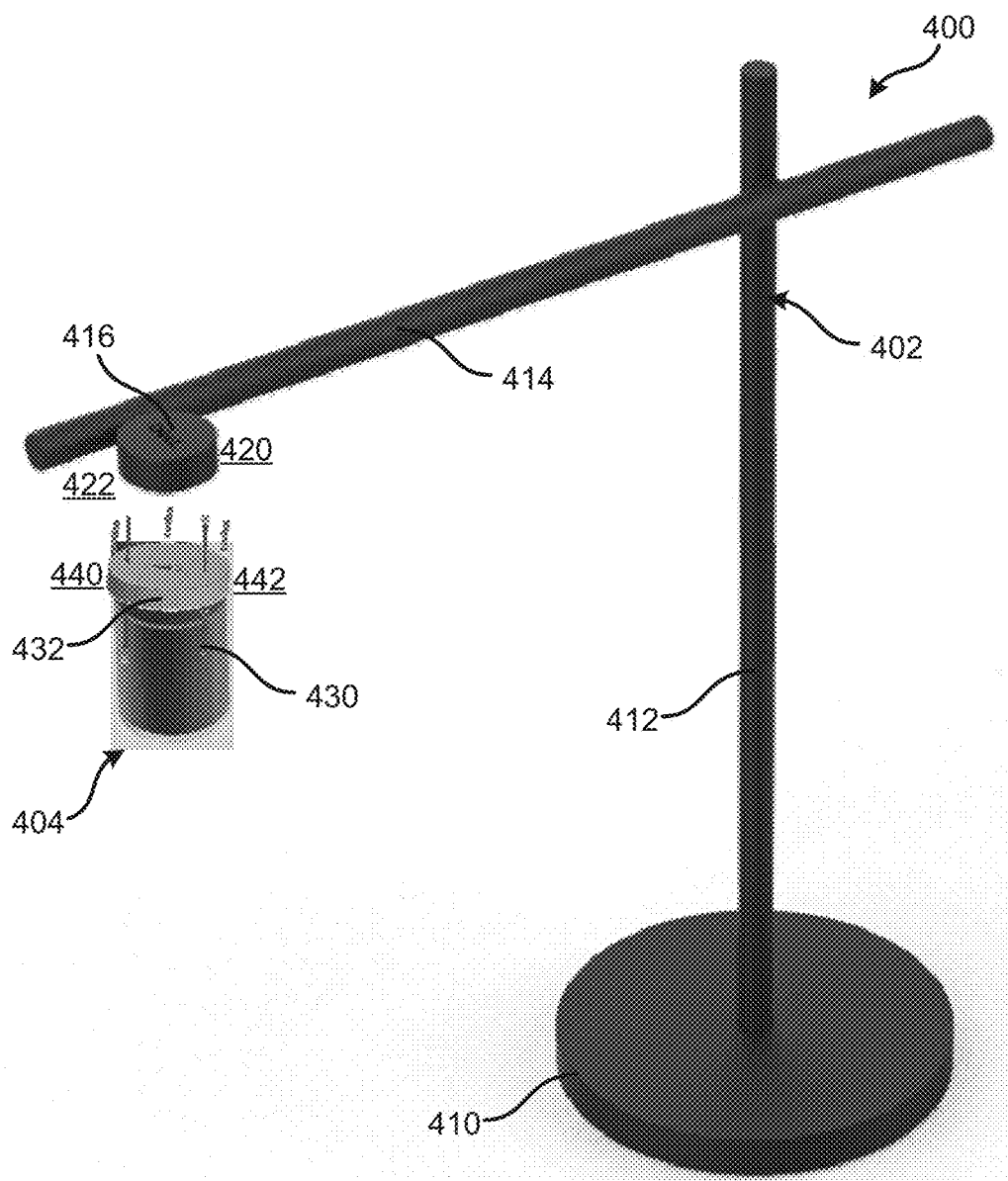
FIG. 4 is a perspective view of a camera system according to an embodiment of the present disclosure.

FIG. 4 illustrates a camera system 400 according to an embodiment of the present disclosure. Camera system 400 includes a stand 402 and a camera module 404. Stand 402 includes a base 410, a vertical support 412, a horizontal support 414, and magnet 416. Magnet 416 includes magnetic poles 420 and 422. Camera module 404 includes a camera 430 and a magnetic assembly 432. Magnetic assembly 432 includes magnetic poles 440 and 442. In an example, camera module 404 may be substantially similar to camera module 102 of FIG. 1 and camera module 300 of FIG. 3.

In certain examples, a first end of vertical support 412 may be in physical communication with base 410, and the vertical support may extend away from the base in a substantially perpendicular direction. Horizontal support 414 may be connected to vertical support 412 at any particular location from the first end to a second end of the vertical support. The second end of vertical support may be a distal end with respect to base 410. In an example, a first end of horizontal support 414 may be in physical communication with vertical support 412, and the horizontal support may extend away from the base in a substantially perpendicular direction. Magnet 416 may be connected to horizontal support 414 at any particular location from the first end to a second end of the horizontal support.

In an example, magnetic poles 420 and 422 may be arranged in any suitable configuration. For example, magnetic pole 420 may be a south pole and magnetic pole 422 may be a north pole. In another example, magnetic pole 420 may be a north pole and magnetic pole 422 may be a south pole. In an example, magnetic poles 440 and 442 may be arranged in any suitable configuration. For example, magnetic pole 440 may be a south pole and magnetic pole 442 may be a north pole. In another example, magnetic pole 440 may be a north pole and magnetic pole 442 may be a south pole.

In certain examples, the polarity of magnet 416 and the polarity of magnetic assembly 432 may be such that the magnet and the magnetic assembly automatically align in a particular orientation. For example, magnetic pole 420 of magnet 416 may have an opposite polarity as compared to magnetic pole 442 of magnetic assembly 432. Similarly, magnetic pole 422 of magnet 416 may have an opposite polarity as compared to magnetic pole 440 of magnetic assembly 432. Based on the polarity orientations of magnet 416 and magnetic assemblyic 432, camera 404 may always be properly oriented on stand 402. In an example, the proper orientation of camera 404 may be that an image capture by the camera is always the same direction. For example, the proper orientation of camera 404 may be with a top portion of the captured image being nearest to base 410 of stand 402. In another example, the proper orientation of camera 404 may be with a top portion of the captured image being furthest from base 410 of stand 402.

Figure 5:
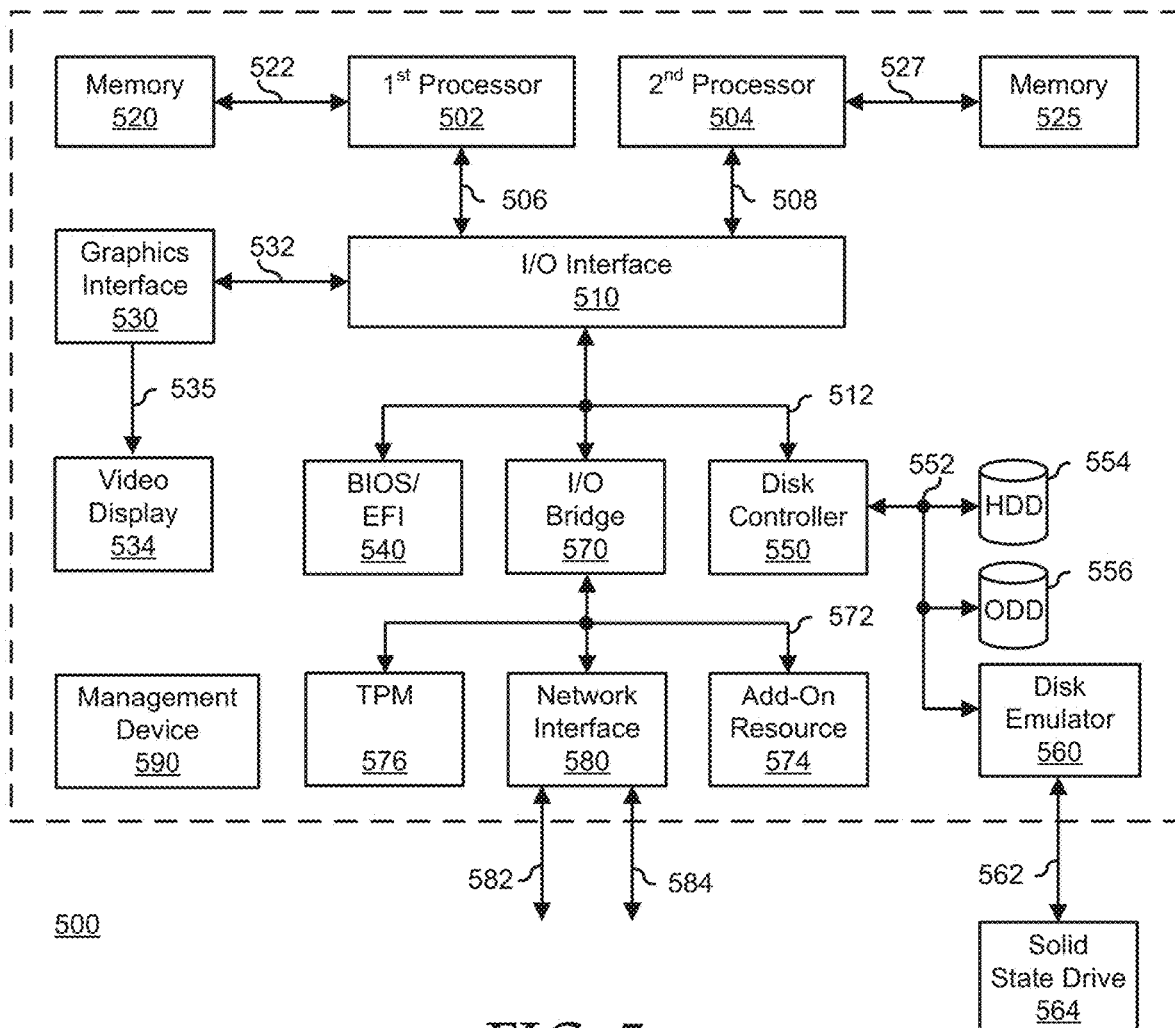
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/ UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 3394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A camera module comprising:
a camera and lens to capture images;
a charging coil located in a bottom portion of the camera module, the charging coil to provide wireless charging of the camera; and a magnetic assembly located in a rear portion of the camera module, wherein magnetic polarities of the magnetic assembly produce a large magnetic flux outside the camera module and a low magnetic flux within the camera module;

wherein the charging coil is located a separation distance from the magnetic assembly and a second distance from the lens, the separation distance and the second distance being less than a width between the magnetic assembly and the lens;

wherein the magnetic assembly is configured to have a same shape as an adjacent portion of the camera.

2. The camera module of claim 1, wherein the magnetic assembly is created by a combination of first, second, and third magnets.

3. The camera module of claim 2, wherein the first magnet has a first polarity configuration, the second magnet has a second polarity configuration, and the third magnet has a third polarity configuration.

4. The camera module of claim 2, wherein the first, second, and third magnets are arranged in a hallbach configuration.

5. The camera module of claim 2, wherein the second magnet has a first magnetic polarity along a first edge of the second magnet, wherein the first edge of the second magnet is in physical communication with a first edge of the first magnet, wherein the first magnet has a varying magnetic polarity along a length of the first edge of the first magnet.

6. The camera module of claim 2, wherein a first end of a first edge of the first magnet has a second magnetic polarity, and a second end of the first edge of the first magnet has the first magnetic polarity.

7. The camera module of claim 1, wherein the separation distance is greater than a distance the low magnetic flux extends within the camera module.

8. The camera module of claim 1, wherein the large magnetic flux outside the camera module enables the camera module to be securely attached to a video display of an information handling system.

9. A camera system comprising:
a charging stand including:
a back portion; and
a first charging coil; and
a camera module in physical communication with the charging stand, the camera module including:
a camera;
a lens;
a second charging coil located in a bottom portion of the camera module, the second charging coil to align with the first charging coil and to provide wireless charging of the camera; and
a magnetic assembly located in a rear portion of the camera module, the magnetic assembly to be placed in physical communication with the back portion, wherein magnetic polarities of the magnetic assembly produce a large magnetic flux outside the camera module and a low magnetic flux within the camera module;
wherein the second charging coil is located a separation distance from the magnetic assembly and a second distance from the lens, the separation distance and the second distance being less than a width between the magnetic assembly and the lens;
wherein the magnetic assembly is configured to have a same shape as an adjacent portion of the camera.

10. The camera system of claim 9, wherein the magnetic assembly is created by a combination of first, second, and third magnets.

11. The camera system of claim 10, wherein the first magnet has a first polarity configuration, the second magnet has a second polarity configuration, and the third magnet has a third polarity configuration.

12. The camera system of claim 10, wherein the first, second, and third magnets are arranged in a hallbach configuration.

13. The camera system of claim 10, wherein the second magnet has a first magnetic polarity along a first edge of the second magnet, wherein the first edge of the second magnet is in physical communication with a first edge of the first magnet, wherein the first magnet has a varying magnetic polarity along a length of the first edge of the first magnet.

14. The camera system of claim 10, wherein a first end of a first edge of the first magnet has a second magnetic polarity, and a second end of the first edge of the first magnet has the first magnetic polarity.

15. The camera system of claim 9, wherein the separation distance is greater than a distance the low magnetic flux extends within the camera module.

16. The camera system of claim 9, wherein the large magnetic flux outside the camera module enables the camera module to be securely attached to a video display of an information handling system.

17. A camera system comprising:
a charging stand including:
a back portion; and
a first charging coil; and
a camera module in physical communication with the charging stand, the camera module includes:
a camera;
a lens;
a second charging coil located in a bottom portion of the camera module, the second charging coil to align with the first charging coil and to provide wireless charging of the camera; and
a magnetic assembly located in a rear portion of the camera module, the magnetic assembly to be placed in physical communication with the back portion, wherein the magnetic assembly is created by a combination of first, second, and third magnets, wherein magnetic polarities of the magnetic assembly produce a large magnetic flux outside the camera module and a low magnetic flux within the camera module;
wherein the second charging coil is located a separation distance from the magnetic assembly, wherein the separation distance is greater than a distance that the low magnetic flux extends within the camera module;
wherein the second charging coil is located a second distance from the lens, the separation distance and the second distance being less than a width between the magnetic assembly and the lens;
wherein the magnetic assembly is configured to have a same shape as an adjacent portion of the camera.

18. The camera system of claim 17, wherein the first magnet has a first polarity configuration, the second magnet has a second polarity configuration, and the third magnet has a third polarity configuration.

19. The camera system of claim 17, wherein the second magnet has a first magnetic polarity along a first edge of the second magnet, wherein the first edge of the second magnet is in physical communication with a first edge of the first magnet, wherein the first magnet has a varying magnetic polarity along a length of the first edge of the first magnet.

20. The camera system of claim 17, wherein a first end of a first edge of the first magnet has a second magnetic polarity, and a second end of the first edge of the first magnet has the first magnetic polarity.

\* \* \* \* \*